US010070576B2

(12) United States Patent
Swanson

(10) Patent No.: US 10,070,576 B2
(45) Date of Patent: Sep. 11, 2018

(54) SEED ENTRAINING SYSTEMS, METHODS AND APPARATUS

(71) Applicant: Precision Planting LLC, Tremont, IL (US)

(72) Inventor: Todd Swanson, Washington, IL (US)

(73) Assignee: Precision Planting LLC, Tremont, IL (US)

( * ) Notice: Subject to any disclaimer, the term of this patent is extended or adjusted under 35 U.S.C. 154(b) by 43 days.

(21) Appl. No.: 14/894,570

(22) PCT Filed: May 30, 2014

(86) PCT No.: PCT/US2014/040347
§ 371 (c)(1),
(2) Date: Nov. 30, 2015

(87) PCT Pub. No.: WO2014/194263
PCT Pub. Date: Dec. 4, 2014

(65) Prior Publication Data
US 2016/0135361 A1   May 19, 2016

Related U.S. Application Data

(60) Provisional application No. 61/828,727, filed on May 30, 2013.

(51) Int. Cl.
| | |
|---|---|
| *A01C 7/08* | (2006.01) |
| *A01C 7/16* | (2006.01) |
| *A01C 7/12* | (2006.01) |
| A01C 7/04 | (2006.01) |

(52) U.S. Cl.
CPC ............. *A01C 7/082* (2013.01); *A01C 7/081* (2013.01); *A01C 7/088* (2013.01); *A01C 7/124* (2013.01); *A01C 7/163* (2013.01); A01C 7/044 (2013.01)

(58) Field of Classification Search
CPC .......... A01C 7/082; A01C 7/084; A01C 7/163
USPC .................................. 406/123; 111/174, 175
See application file for complete search history.

(56) References Cited

U.S. PATENT DOCUMENTS

| | | | | |
|---|---|---|---|---|
| 4,101,175 A * | 7/1978 | Kull | ....................... | B65G 53/12 105/248 |
| 4,503,786 A | 3/1985 | Tautfest | | |
| 4,582,254 A * | 4/1986 | Rotolico | ............... | B05B 7/1445 239/307 |
| 4,729,514 A * | 3/1988 | Ostrom | .................. | A01C 7/004 111/130 |
| 4,793,743 A * | 12/1988 | Grodecki | ............... | A01C 7/081 406/123 |
| 5,265,547 A | 11/1993 | Daws | | |

(Continued)

OTHER PUBLICATIONS

International Search Report and Written Opinion, dated Sep. 30, 2014, pp. 1-14.
Extended European Search Report, dated Dec. 21, 2016, pp. 1-9.

*Primary Examiner* — Joseph Dillon, Jr.
(74) *Attorney, Agent, or Firm* — Thomas J. Oppold; Larkin, Hoffman, Daly & Lindgren, Ltd.

(57) ABSTRACT

Systems, methods and apparatus are provided for entraining seed into a plurality of seed supply lines. Some embodiments enable selective prevention of seeds from entering a subset of seed supply lines. Some embodiments enable improved flow of seed through an entrainer by angled surfaces provided on blocking members disposed to selectively block seed from entering seed supply lines.

14 Claims, 10 Drawing Sheets

(56) References Cited

U.S. PATENT DOCUMENTS

| | | | | |
|---|---|---|---|---|
| 5,592,889 | A | * | 1/1997 | Bourgault ............ A01C 15/006 |
| | | | | 111/174 |
| 5,924,370 | A | * | 7/1999 | Gregor .................. A01C 7/127 |
| | | | | 111/174 |
| 5,979,343 | A | * | 11/1999 | Gregor .................. A01C 7/081 |
| | | | | 111/175 |
| 6,581,533 | B1 | | 6/2003 | Hagen et al. |
| 6,668,738 | B2 | | 12/2003 | Lee et al. |
| 6,883,445 | B2 | | 4/2005 | Mayerle |
| 6,892,909 | B1 | * | 5/2005 | Hebert .................. A01C 7/081 |
| | | | | 111/174 |
| 7,104,204 | B2 | | 9/2006 | McCartney |
| 8,141,504 | B2 | | 3/2012 | Dean et al. |
| 2008/0295751 | A1 | * | 12/2008 | Shoup .................... A01C 7/081 |
| | | | | 111/174 |
| 2009/0314191 | A1 | | 12/2009 | Friggstad |
| 2010/0101469 | A1 | | 4/2010 | Landphair |
| 2011/0162566 | A1 | | 7/2011 | Wilhelmi et al. |
| 2012/0103238 | A1 | | 5/2012 | Beaujot et al. |
| 2012/0173093 | A1 | | 7/2012 | Kowalchuk |
| 2012/0211508 | A1 | * | 8/2012 | Barsi ...................... A01C 7/081 |
| | | | | 221/13 |
| 2014/0193214 | A1 | * | 7/2014 | Johnson ................ A01C 7/081 |
| | | | | 406/122 |
| 2015/0181800 | A1 | * | 7/2015 | Glowa .................... A01C 7/04 |
| | | | | 111/200 |
| 2015/0296703 | A1 | * | 10/2015 | Audigie ................ A01C 7/081 |
| | | | | 222/637 |
| 2017/0156259 | A1 | * | 6/2017 | Barsi ...................... A01C 7/082 |

* cited by examiner

SEED ENTRAINING SYSTEMS, METHODS AND APPARATUS

BACKGROUND

In recent years, the expanded size of farm operations and limited amount of time to plant fields has resulted in increased use of bulk-fill planters which direct centrally-filled hopper or hopper supplies seed to a plurality of planter row units via an entrainer configured to form an air-seed mixture for transmission to the row units. However, existing solutions for changing configurations of such bulk-fill planters are ineffective. In particular, existing solutions for planting only a subset of rows from an entrainer are time-consuming and ineffective.

Thus there is a need in the art for seed entraining systems, methods, and apparatus having improved configuration selection.

DESCRIPTION

Figure 9:
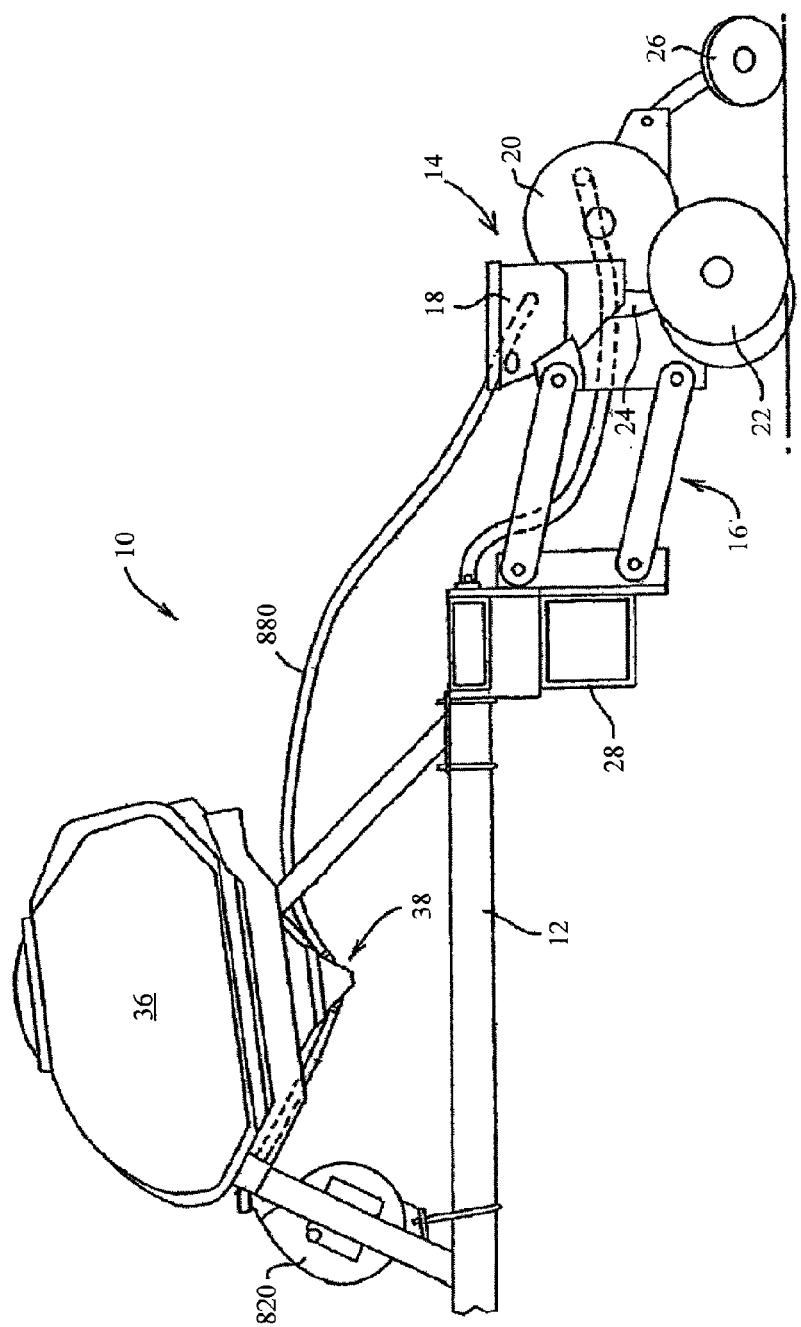
FIG. 9 is a side elevation view of a conventional agricultural planter.

Referring now to the drawings, wherein like reference numerals designate identical or corresponding parts throughout the several views, FIG. 9 illustrates a conventional central-fill planter 10 such as that disclosed in U.S. Pat. No. 6,581,533, incorporated herein by reference.

The central fill planter 10 includes a main frame 12 having a main tool bar 28 from which a plurality of transversely spaced row units 14 are supported by a parallel linkage 16. The parallel linkage 16 enables the individual row units 14 to move vertically independently of one another to conform to terrain or upon encountering an obstacle during planting operations. Each of the individual row units 14 includes an auxiliary hopper 18, the purpose of which will be described later. Additionally, each row unit 14 includes a seed meter 20, a furrow opening assembly 22 and a furrow closing assembly 26. The main frame 12 also supports a bulk hopper 36 and an air pump or blower 820. The main hopper holds a bulk supply of seed. An entrainer 38 is mounted to a bottom portion of the bulk hopper 36 such that seed flows by gravity from the bulk hopper 36 into the entrainer 38.

In operation, air from the blower 820 blows seed from the entrainer 38 through a plurality of seed supply lines 880 to a plurality of auxiliary hoppers 18. The seed meter 20 meters seed received from the auxiliary hopper 18. The furrow opening assembly 22 forms the planting furrow in the soil surface into which the individual seeds metered at regularly spaced intervals by the seed meter 20 are deposited after being directed downwardly and rearwardly by a seed tube 24. The closing assembly 26 pushes the soil back into the furrow, covering the seed.

Figure 1:
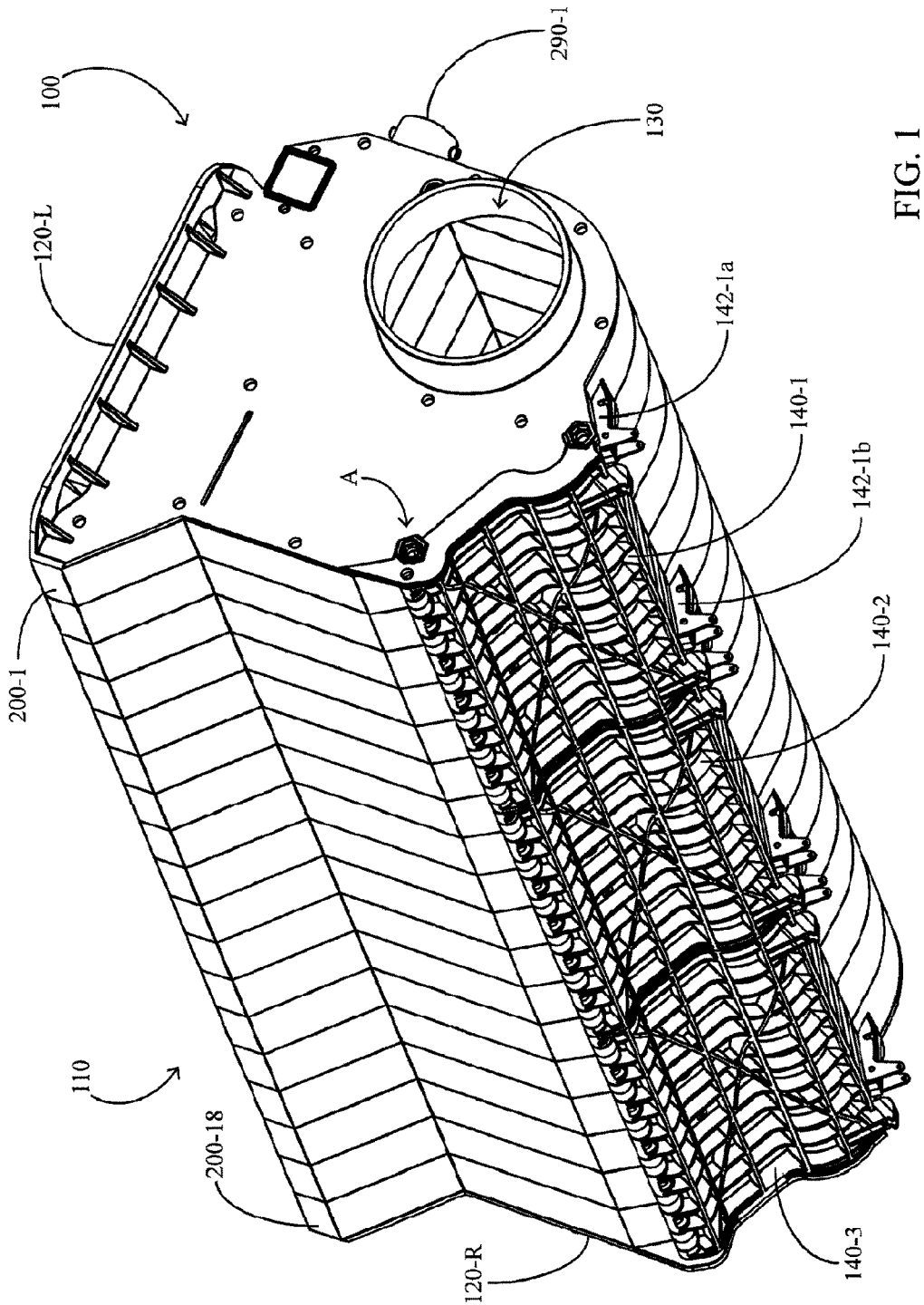
FIG. 1 is a front perspective view of an embodiment of a seed entrainer.
Figure 2:
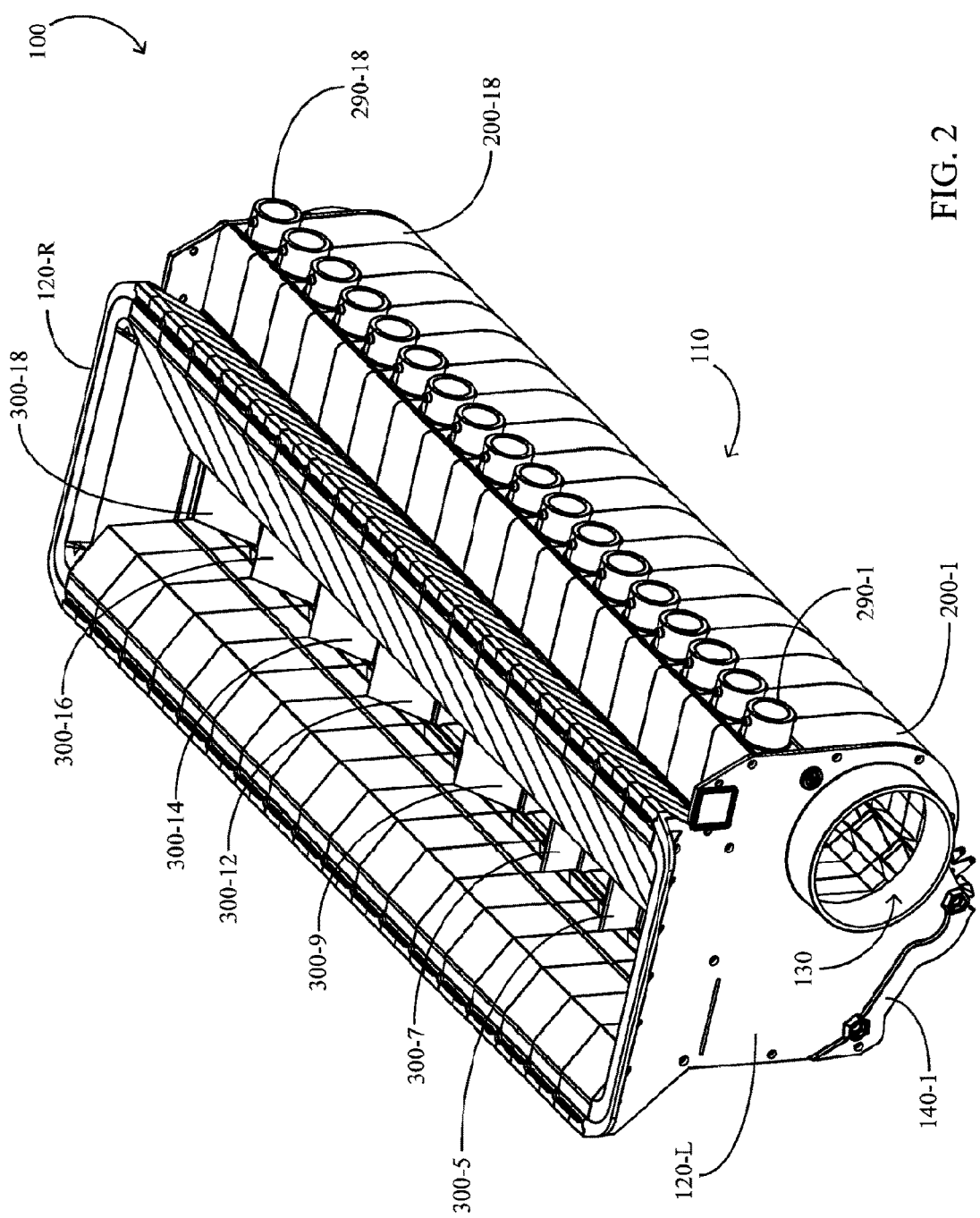
FIG. 2 is a rear perspective view of the seed entrainer of FIG. 1.
Figure 3:
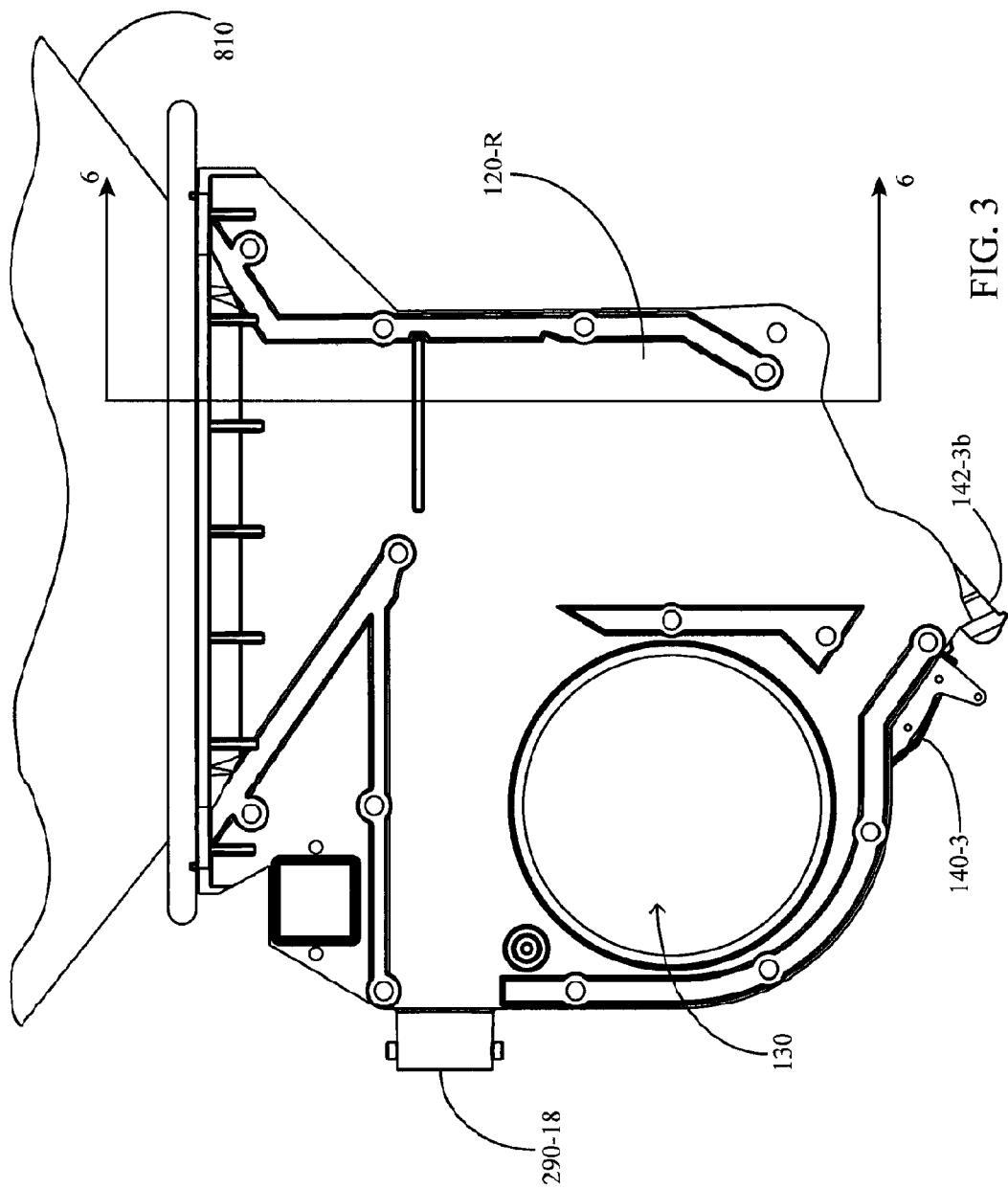
FIG. 3 is a right side elevation view of the seed entrainer of FIG. 1 having a bulk seed hopper mounted thereto.

An improved entrainer 100 is illustrated in FIGS. 1-3. The entrainer 100 preferably includes a distribution array 110 comprising a plurality of entrainer modules 200. The illustrated entrainer embodiment is an 18-row entrainer including entrainer modules 200-1 through 200-18. Each entrainer module 200 is preferably configured to deliver seed to an associated auxiliary hopper as described in more detail below. The entrainer modules 200 are preferably mounted side-by-side between a left plate 120-L and a right plate 120-R. A plurality of cleanout doors 140 are preferably pivotally mounted to the entrainer 100 about a common axis generally indicated by reference character A. Unlatching a pair of latches 142 associated with each cleanout door 140 permits the operator to remove unused seed from the entrainer 100. An air line (not shown) directs air from the blower 820 into a manifold 130. The manifold 130 extends longitudinally through the entrainer 100, supplying air flow to each entrainer module 200. As illustrated in FIG. 3, the bulk hopper 810 is mounted to an upper end of the entrainer 100 such that seeds flow by gravity from the bulk hopper into the entrainer 100.

Figure 4:
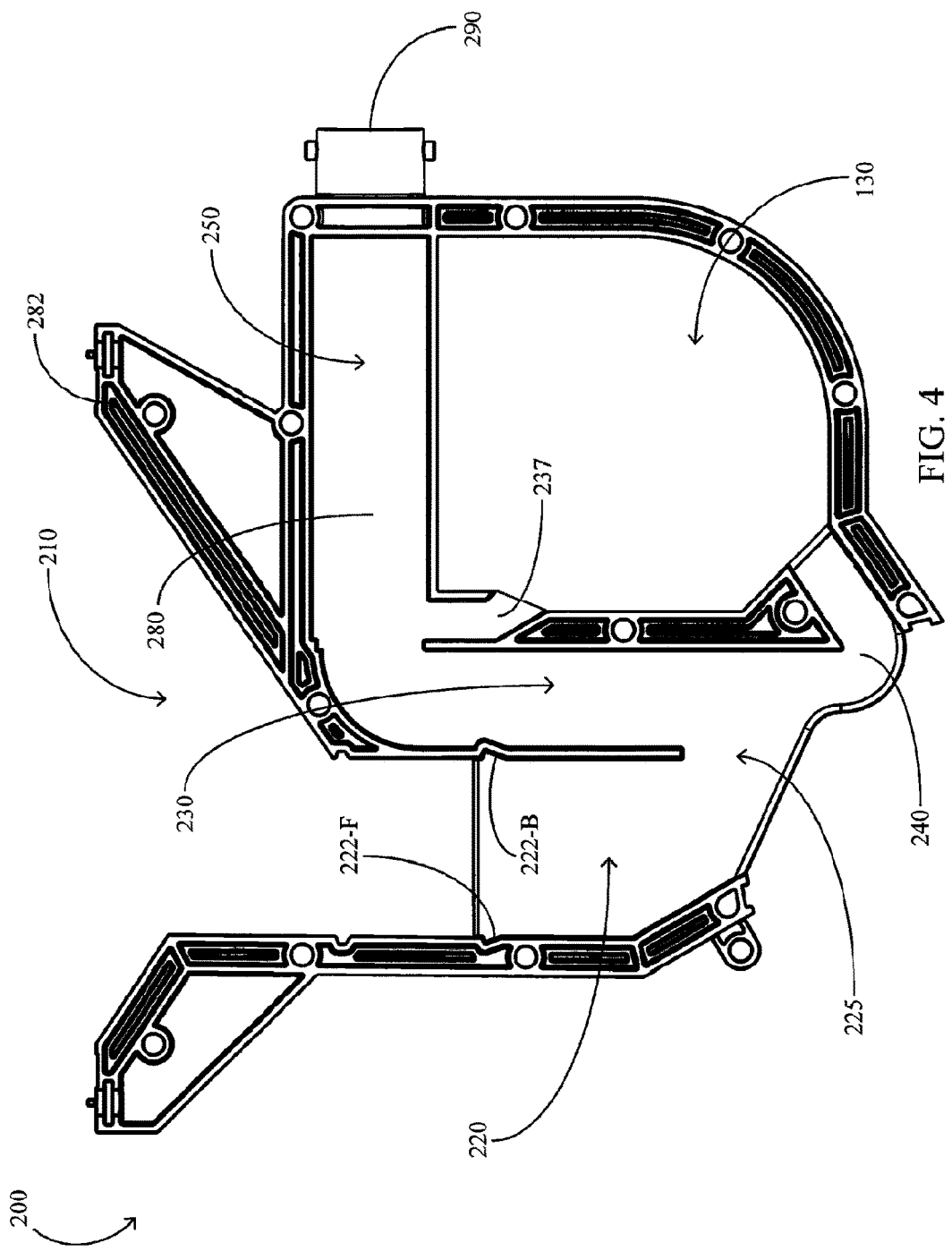
FIG. 4 is a left side elevation view of an embodiment of an entrainer module of the seed entrainer of FIG. 1.
Figure 5:
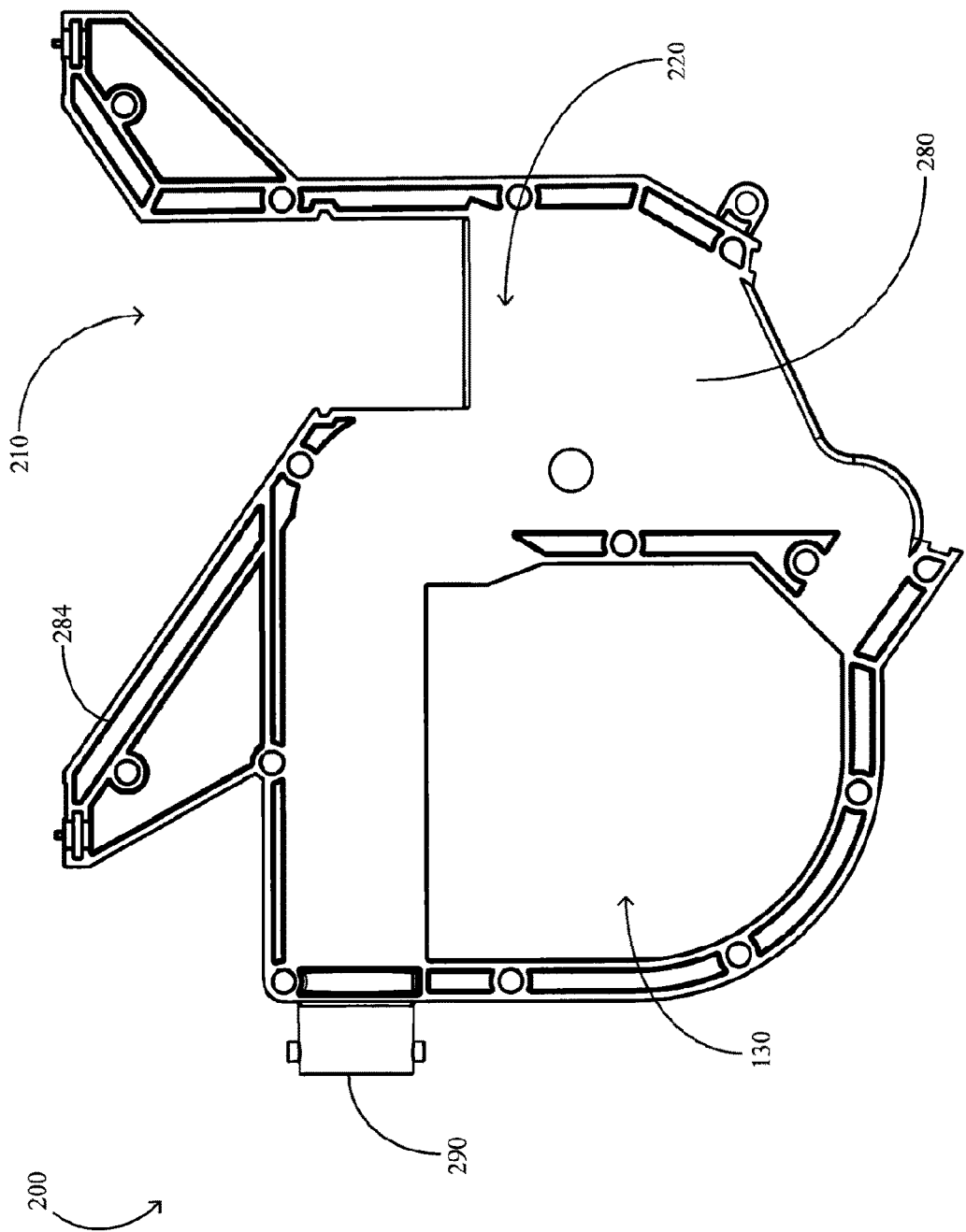
FIG. 5 is a right side elevation view of the entrainer module of FIG. 4.

Turning to FIGS. 3 and 4, the entrainer module 200 is illustrated in detail; the entrainer modules 200 are preferably interchangeable. Seed flows in dense phase from the bulk hopper 810 into a tapered entry region indicated generally by reference numeral 210. Seed flows in dense phase from the tapered entry region into an inlet 220 bounded on transverse sides by a wall 280 of the entrainer module 200 and a wall 280 of a neighboring entrainer module 220 (see, e.g., the inlet 220-5 illustrated in FIG. 6, bounded by the walls 280-5 and 280-4). It should be appreciated that the walls 280 transversely constrain the seed within the module 200 as the seed travels from the inlet 220 to an outlet 290, described later herein. Seed passes through an opening 225 into a vertical column 230. Air from the manifold 130 passes through a chamber 240 into the column 230, entraining seeds into an air-seed mixture which travels from the column 230 into a horizontal chamber 250. Air flows from the manifold 130 to the horizontal chamber 250 through a chamber 237. The air-seed mixture travels from the horizontal chamber through the entrainer outlet 290 to the auxiliary hopper 18 associated with the entrainer module 200. Each entrainer module 200 preferably includes corresponding extrusions 284 and slots 282 by which neighboring entrainer modules are preferably mated.

Figure 8:
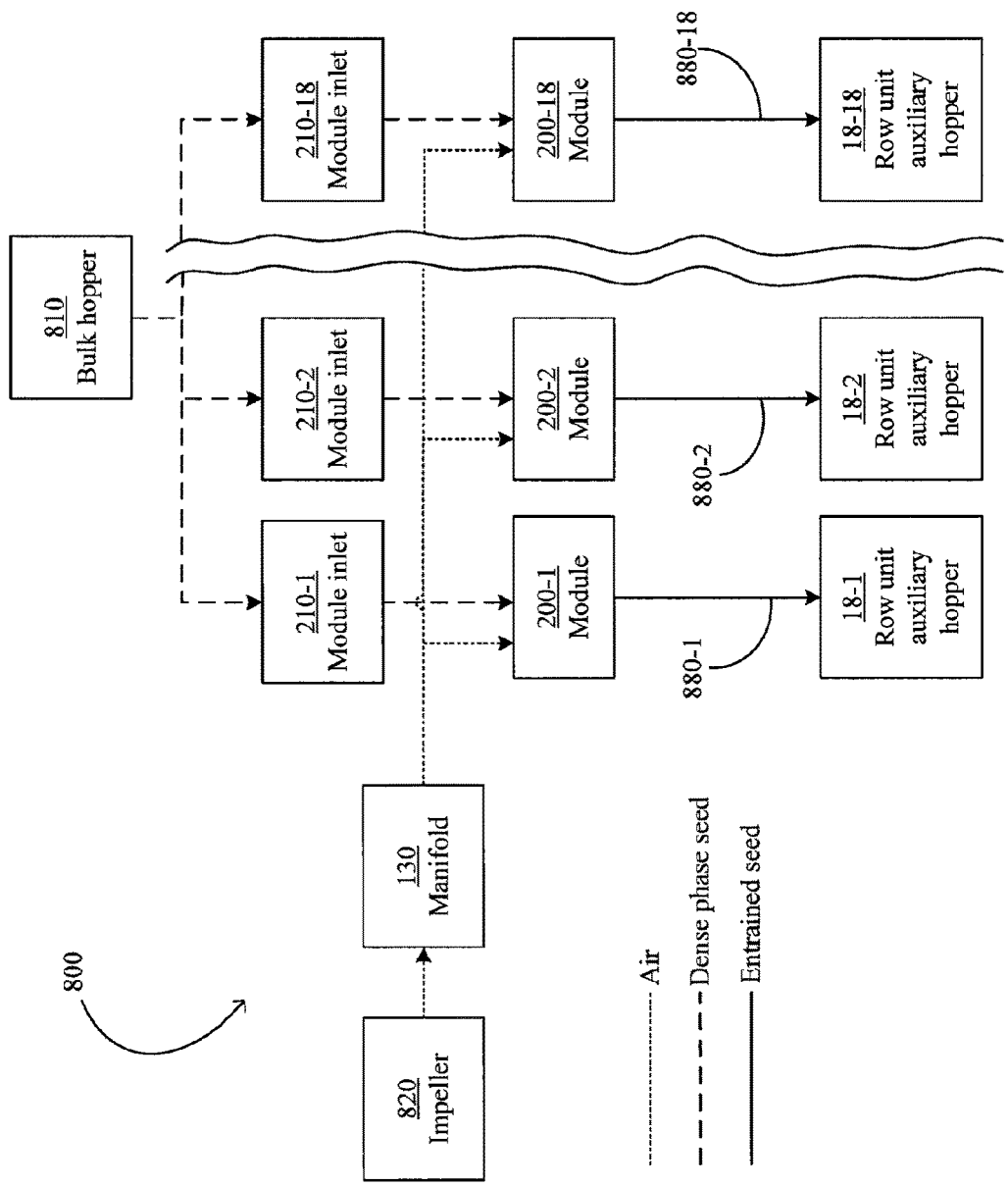
FIG. 8 schematically illustrates an embodiment of a bulk seed distribution system.

A bulk seed delivery system 800 is illustrated in FIG. 8. It should be appreciated that in some embodiments the components of the system 800 are those described elsewhere herein and having like reference numerals. The bulk hopper 810 is preferably in seed communication, preferably dense phase seed communication, with the module entry regions 210-1 through 210-18 (it should be appreciated that although the embodiment described herein is an 18-row embodiment, other maximum numbers of rows per entrainer are contemplated). Each module entry region 210 is in seed communication, preferably dense phase seed communication, with the associated entrainer module 200. The blower 820 is in fluid communication with the manifold 130. The manifold 130 is preferably in fluid communication with each of the modules 200. In operation, air flows from the blower 820 through the manifold 130 and into each module 200. Each module 200 is preferably in fluid and seed communication with an associated row unit auxiliary hopper 18 via an individual seed supply line 880. An air-seed mixture (i.e., air-entrained seed) travels from each module 200 to the associated auxiliary hopper 18 through the associated seed supply line 880.

Row Configuration Selection

Figure 6:
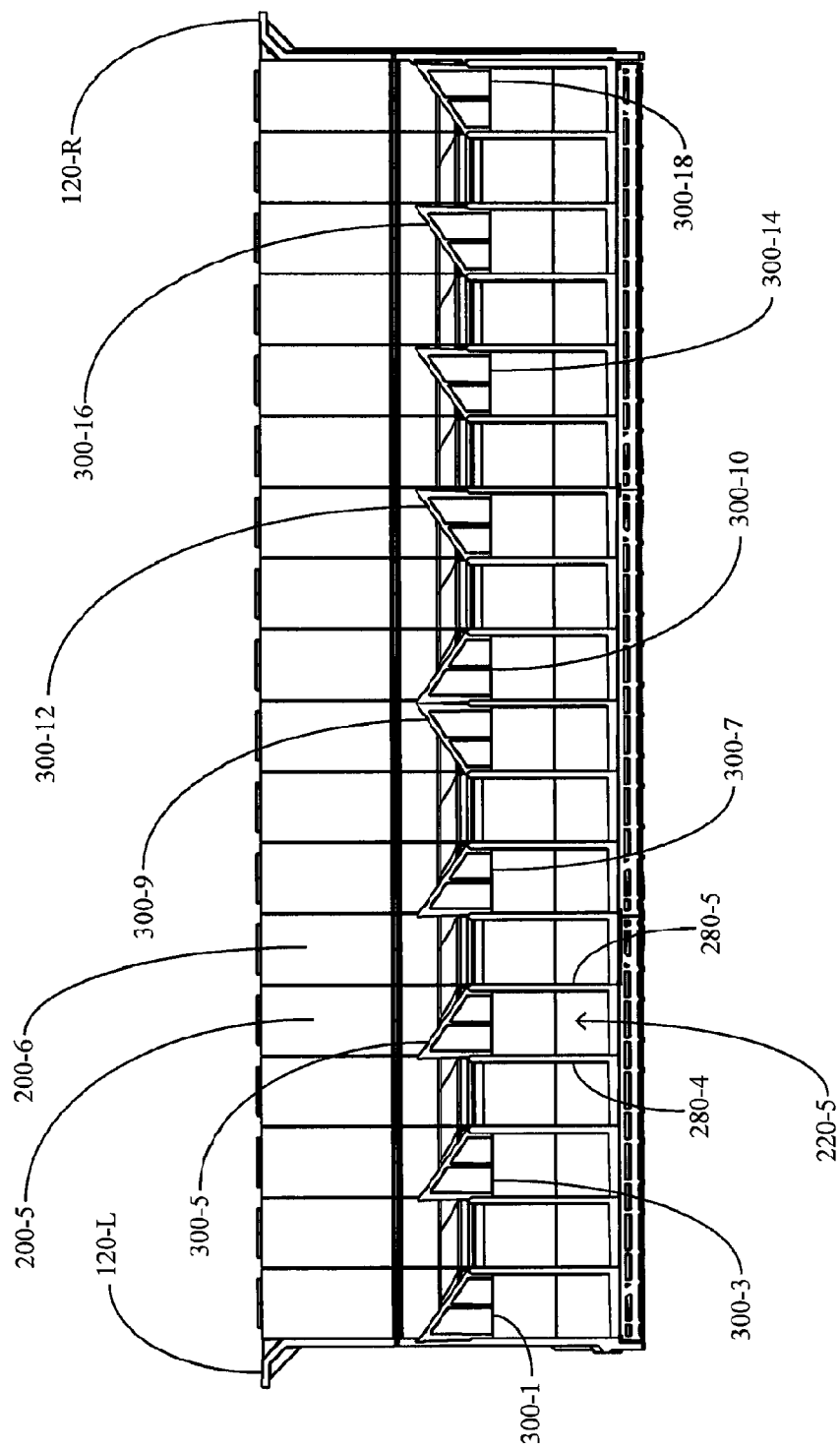
FIG. 6 is a cross-sectional view of the seed entrainer of FIG. 1 along the cross-section 6-6 of FIG. 3.

Turning to FIG. 6, each module 200 of the entrainer 100 is preferably configured to partially receive a blocking wedge 300 in an upper portion of the inlet 220. It should be appreciated that when a blocking wedge (e.g., blocking wedge 300-5) is inserted into an entrainer module 200 as illustrated in FIG. 6, seed is prevented from flowing from the bulk hopper 810 into the affected module 200 (e.g., module 200-5). In the illustrated embodiment, the blocking wedges 300 effectively reduce the entrainer 100 from its maximum 18-row configuration to an 8-row configuration. Multiple row configurations may be achieved using the same entrainer by selectively blocking varying numbers of modules 200 using blocking wedges 300.

Figure 7:
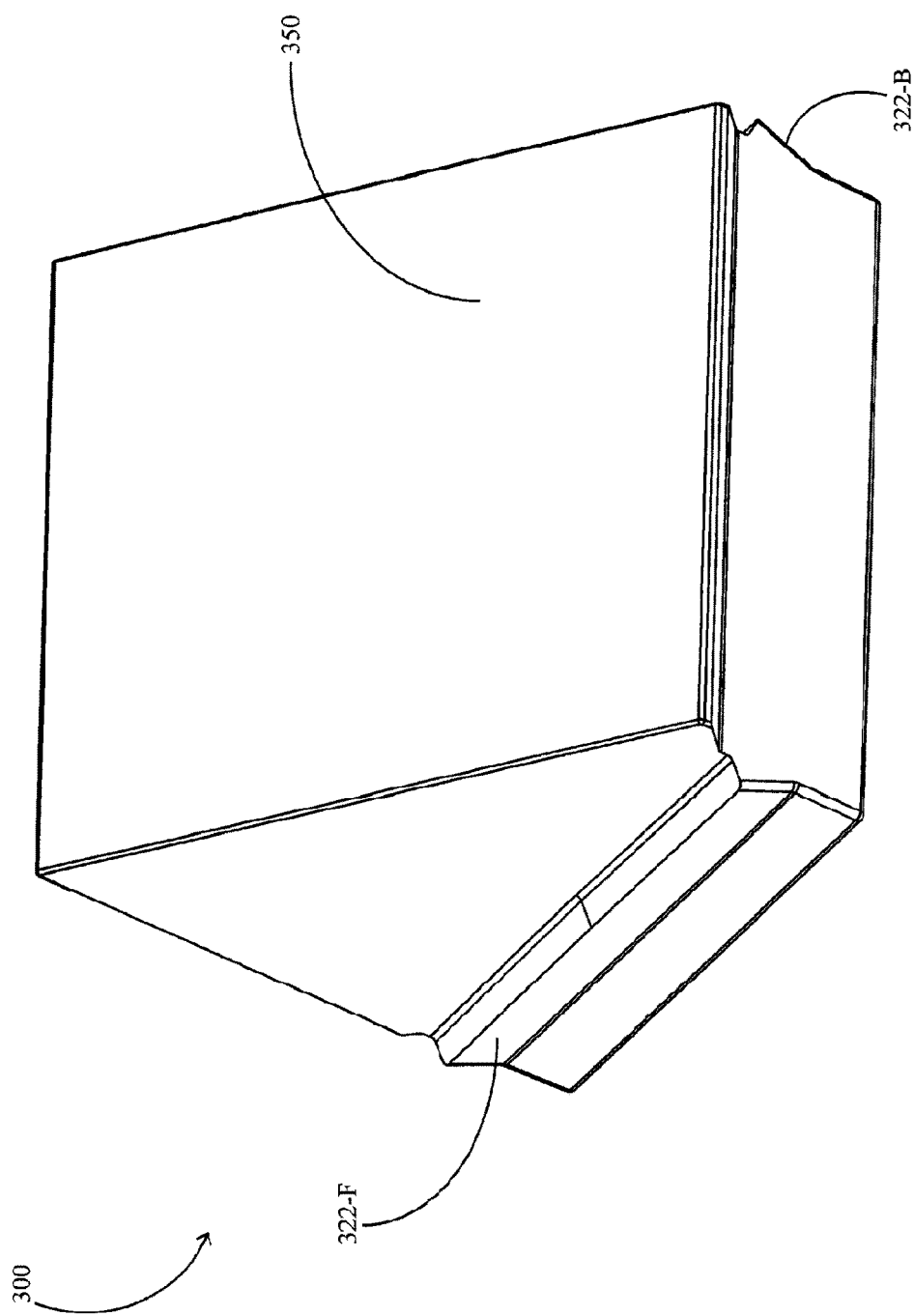
FIG. 7 is a perspective view of a blocking wedge of the seed entrainer of FIG. 1.

Referring to FIGS. 4 and 7, each blocking wedge 300 preferably includes extruding ridges 322-B, 322-F formed in opposing sides of the block. The ridges 322 are preferably configured to fit within corresponding notches 222-B, 222-F formed in the back and front, respectively, of the inlet 220. Each notch is preferably configured to retain a vertical position of the blocking wedge, e.g., by contacting upper and lower surfaces of the ridge 322 in the illustrated embodiment. The notches 222-B, 222-F are preferably substantially symmetrical about a vertical plane, and the ridges 322 are preferably substantially symmetrical about the same plane when the blocking wedge 300 is inserted in the inlet 220, such that the same blocking wedge 300 may be inserted either in a left-facing or right-facing orientation into the inlet 220.

Referring to FIGS. 6 and 7, each blocking wedge 300 preferably includes an angled surface 350, preferably oriented at approximately 45 degrees from vertical. Blocking wedges inserted in outboard entrainer modules (e.g., modules 300-3 and 300-18) are preferably oriented in an "inboard-facing" orientation such that the angled surface 350 faces inboard, guiding dense phase seed toward the transverse center of the entrainer 100 as the seed flows from the bulk hopper 810 into the entrainer. It should be appreciated that because the blocking wedge ridges 322 and the module inlet notches 222 are symmetrical, the blocking wedges 300 may be used interchangeably to block left-side or right-side outboard entrainer modules with the desired inboard-facing orientation.

It should be appreciated that in the illustrated embodiment, each blocking wedge 300 prevents seed from entering the associated entrainer module such that seed introduced to the bulk hopper 810 can be planted in its entirety from each of the unblocked entrainer modules without leaving unplanted seed in the blocked entrainer modules.

Row Configuration Selection

Figure 10:
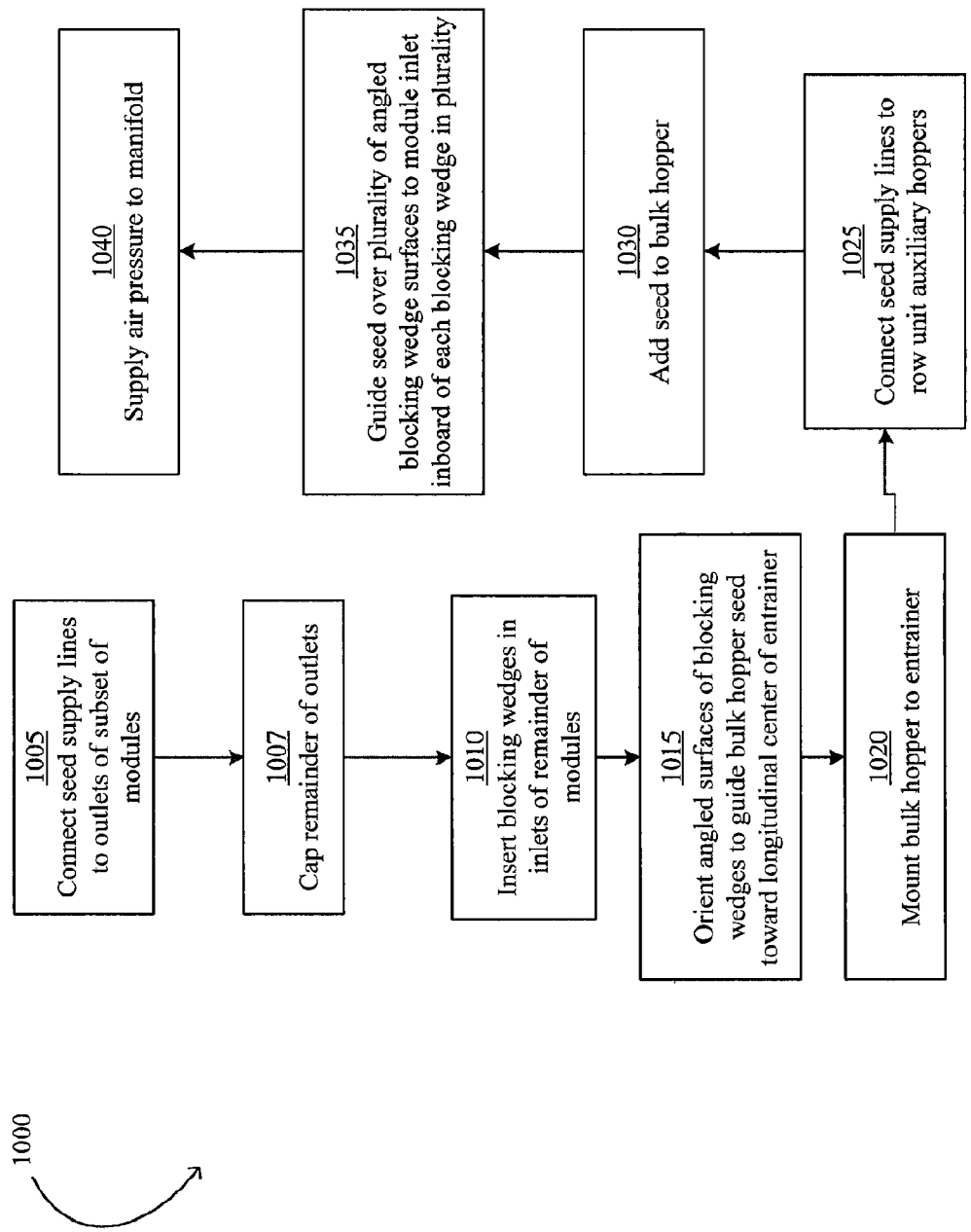
FIG. 10 illustrates an embodiment of a process for selecting a row configuration and operating a seed entrainer.

A process 1000 for selecting an entrainer row configuration is illustrated in FIG. 10. At step 1005, the operator connects a seed supply line 880 to the outlet 290 of a subset of the modules 200. For example, if the operator desires to supply eight row units with seed using the entrainer 100, the subset comprises eight of the modules 200 such that eight of the module outlets 290 are placed in seed and fluid communication with individual seed supply lines 880. The subset of module outlets is preferably substantially evenly distributed among the outlets 290; for example, in the illustrated embodiment having eighteen entrainer modules 200-1 through 200-18, a subset of eight selected module outlets preferably comprises the module outlets 290-2, 290-4, 290-6, 290-8, 290-11, 290-13, 290-15, 290-17. At step 1007, the operator preferably closes the remainder of the module outlets 290, i.e., the outlets not selected at step 1005; in some embodiments, a cap (not shown) is used to seal the remainder of the module outlets. At step 1010, the operator preferably inserts a blocking wedge 300 in the inlet 220 of each of the remainder of the modules 200, i.e., the modules not in the subset selected at step 1005. At step 1015, the operator preferably orients the blocking wedges 300 to guide seed flowing from the bulk hopper 810 toward the longitudinal center of the entrainer 100; e.g., by orienting the angled surfaces 350 in an inboard-facing manner as best illustrated in FIG. 6. It should be appreciated that the steps 1010 and 1015 are preferably performed substantially simultaneously, e.g. by orienting the blocking wedge 300 as desired while inserting it into the inlet 220. At step 1020, the operator preferably mounts the bulk hopper 810 to the entrainer 100. At step 1025, the operator preferably connects each of the seed supply lines 880 to a row unit auxiliary hopper 18 such that each of the subset of modules 200 selected at step 1005 is in fluid and seed communication with a row unit auxiliary hopper. At step 1030, the operator preferably adds seed to the bulk hopper 810. At step 1035, as seed flows from the bulk hopper 810 into the entrainer 100, seed is guided over a plurality of blocking wedges (e.g., blocking wedge 300-5 in FIG. 6) into the inlet 220 of an entrainer module 200 inboard of and adjacent to each blocking wedge 300 (e.g., module 200-6 of FIG. 6). At step 1040, the operator preferably supplies air pressure to the manifold 130 (e.g., by supplying power to the blower 820) such that seed is entrained and supplied to each of the row unit auxiliary hoppers 18.

It should be appreciated that the steps of process 1000 may be carried out at different stages by different operators; for example, the steps 1010, 1015, 1020 may be performed in an assembly phase by a manufacturer while the remaining steps may be performed in a setup phase by a retailer or end user.

In a preferred embodiment, the planter 10 is provided with a plurality (preferably two) bulk hoppers 810 and entrainers 100.

Although the entrainer 100 embodiments described herein comprise individual separable entrainer modules, other entrainer embodiments may comprise multiple entrainer modules having discrete outlets but formed as a single unitary part.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:
1. An agricultural planter, comprising:
a bulk seed hopper;
an entrainer disposed beneath said bulk seed hopper, said entrainer receiving seed by gravity from said bulk seed hopper, said entrainer including a plurality of entrainer modules, each of said plurality of entrainer modules having a seed inlet disposed at a seed inlet height and a seed outlet;
a plurality of row unit auxiliary hoppers, each said auxiliary hopper in fluid communication with one of said module outlets; and
a plurality of blocking members corresponding to a subset of said plurality of entrainer modules, wherein each seed inlet of said subset of said plurality of entrainer modules removably receiving one of said plurality of blocking members such that each of said plurality of blocking members is disposed to block said seed inlet of one of said subset of said plurality of entrainer modules, each of said plurality of blocking members having an upper surface disposed at an upper surface height, said upper surface height being vertically higher than said seed inlet height.

2. The agricultural planter of claim 1, wherein said upper surface comprises an angled surface, whereby seed passing over said angled surface into said entrainer is guided toward said seed inlet of a neighboring one of said plurality of entrainer modules.

3. The agricultural planter of claim 2, wherein outboard ones of said subset of said plurality of entrainer modules have said angled surface facing inboard, whereby seed entering said entrainer is guided toward a transverse center of said entrainer.

4. An agricultural seed entrainer for an agricultural planter, comprising:
a bulk seed hopper;
a seed entrainer disposed beneath said bulk seed hopper and receiving seed by gravity from said bulk seed hopper, said seed entrainer comprising a plurality of entrainer modules, each of said plurality of entrainer modules having a module inlet and a module outlet, said module inlet having an upper end, said upper end disposed at an inlet height; and
a plurality of blocking members corresponding to a subset of said plurality of entrainer modules, wherein each module inlet of said subset of said plurality of entrainer modules removably receiving one of said plurality of blocking members such that each of said plurality of blocking members is disposed to block said module inlet of one of said subset of said plurality of entrainer modules, each of said plurality of blocking members having an upper surface, said upper surface disposed at an upper surface height, said upper surface height being vertically higher than said inlet height.

5. The agricultural seed entrainer of claim 4, wherein said upper surface comprises an angled surface, whereby seed passing over said angled surface into said seed entrainer flows by gravity over said angled surface into said module inlet of a neighboring one of said plurality of entrainer modules.

6. The agricultural seed entrainer of claim 4, wherein said upper surface comprises an angled surface, whereby seed passing over said angled surface into said seed entrainer is guided toward one side of said blocking member.

7. A method of entraining seed into an air-seed mixture in an agricultural seed entrainer, the seed entrainer positioned beneath a bulk seed hopper, the seed entrainer comprising a plurality of entrainer modules, each of the plurality of entrainer modules having a module inlet, a module outlet and a seed entraining area in pneumatic communication with an air inlet and an air outlet, the module inlet of each of the plurality of entrainer modules disposed to permit seed from the bulk seed hopper to flow by gravity through the module inlet of each of the plurality of entrainer modules and into the entrainer module's entraining area, the method comprising:
inserting a first removable blocking member into the module inlet of a first module of the plurality of entrainer modules;
whereby said first removable blocking member blocks seed from flowing by gravity from the bulk hopper into said module inlet, said first removable blocking member having an upper surface disposed vertically higher than said module inlet of an adjacent second module of the plurality of entrainer modules.

8. The method of claim 7, wherein said upper surface of said first blocking member inserted into the module inlet of said first module guides seed to one side of said first removable blocking member into said second module.

9. The method of claim 7, wherein said upper surface of said first removable blocking member inserted into said module inlet of said first module is angled, causing seed to move by gravity across said upper surface of said first removable blocking member toward said module inlet of said adjacent second module.

10. The method of claim 7, wherein said first blocking member includes ridges and said module inlet of said first module includes corresponding notches, whereby when said first removable blocking member is inserted into said module inlet of said first module, said notches receive said ridges, thereby removably securing said first removable blocking member within said module inlet of said first module.

11. The agricultural seed entrainer of claim 4, wherein outboard ones of said subset of said plurality of entrainer modules have said angled surface facing inboard, whereby seed entering said seed entrainer is guided toward a transverse center of said seed entrainer.

12. The agricultural seed entrainer of claim 4, wherein said upper surface comprises an angled surface, whereby seed passing over said angled surface into said seed entrainer is guided toward said module inlet of a neighboring one of said plurality of entrainer modules.

13. The agricultural planter of claim 1, wherein said upper surface comprises an angled surface, whereby seed passing over said angled surface into said entrainer flows by gravity over said angled surface into said seed inlet of a neighboring one of said plurality of entrainer modules.

14. The agricultural planter of claim 1, wherein said upper surface comprises an angled surface, whereby seed passing over said angled surface into said entrainer is guided toward one side of said blocking member.

\* \* \* \* \*